Oct. 22, 1935.                R. BLONDELLE                    2,018,118
  METHOD FOR TRANSFORMING INTO A MIXTURE OF CARBON MONOXIDE, NITROGEN
    AND HYDROGEN, RESIDUAL GAS AND BLOW-OFF GAS RESULTING FROM THE
         MANUFACTURE OF HYDROGEN BY THE PROCESSES BASED ON THE
                      IRON WATER VAPOR REACTION
                          Filed Jan. 9, 1931
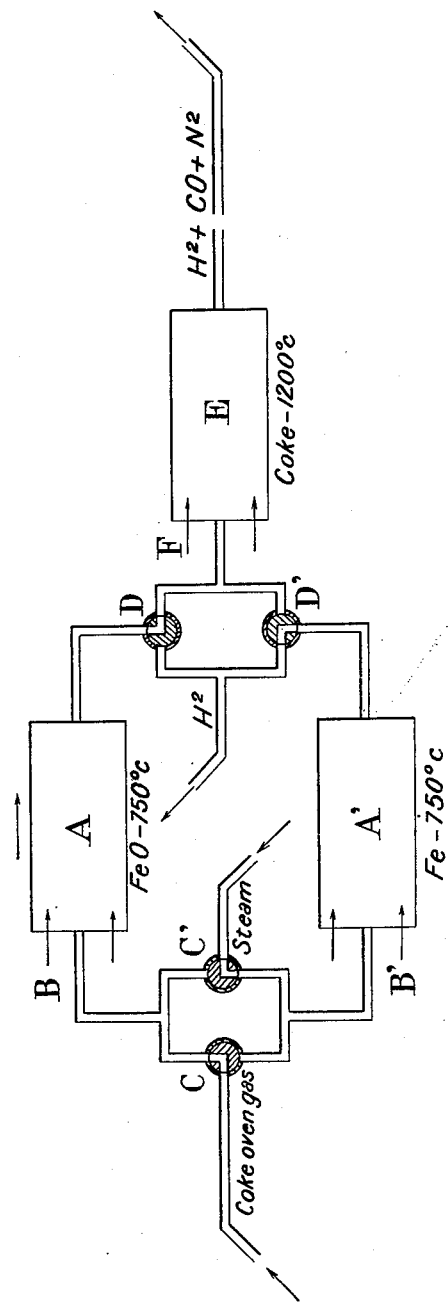
Raymond Blondelle
        Inventor Patented Oct. 22, 1935

2,018,118

UNITED STATES PATENT OFFICE 2,018,118

METHOD FOR TRANSFORMING INTO A MIXTURE OF CARBON MONOXIDE, NITROGEN AND HYDROGEN, RESIDUAL GAS AND BLOW-OFF GAS RESULTING FROM THE MANUFACTURE OF HYDROGEN BY THE PROCESSES BASED ON THE IRON-WATER VAPOR REACTION

Raymond Blondelle, Henin Lietard, France, assignor to Société des Mines de Dourges, Henin Lietard, France Application January 9, 1931, Serial No. 507,750
In France February 28, 1930

1 Claim. (Cl. 23—5)

It is known that the manufacture of hydrogen based on the iron-water vapor reaction is a discontinuous operation, the two main phases of which are:

1. *Oxidation*.—A stream of steam is sent over iron or over a compound the chief ingredient of which is iron, contained in enclosures maintained at a temperature usually in the neighbourhood of 750° C. The formation of hydrogen and iron oxides is thereby produced.

2. *Reduction*.—For rendering possible the formation of a further quantity of hydrogen, it is necessary to reduce the iron oxides. For that purpose, a reducing gas is sent into the apparatus.

The process forming the subject-matter of this invention relates to the use of coke oven gas or of town gas for the reduction of the iron oxides.

Upon issuing from the hydrogen producing apparatus where it effects the reduction of the iron oxides, the coke oven gas or the town gas is impoverished in hydrogen, and enriched in methane, nitrogen, carbon dioxide, hydrocarbons.

It is at a temperature of about 750° C. and contains a high percentage of water vapor (30 to 50%).

It is the gas above defined which is hereinafter designated by the term "residual gas".

According to the present invention, the residual gas upon issuing from the hydrogen producing apparatus is sent into a cracking furnace similar to a gas retort, containing coke giving a small proportion of ashes and of suitable dimensions, maintained, by external heating, at a temperature of about 1200° C.

The main reactions taking place in this furnace are:

$$CO_2 + C = 2CO$$
$$CH_4 = C + 2H_2$$
$$H_2O + C = CO + H_2$$

The nearly complete transformation of the residual gas into a mixture of carbon monoxide, nitrogen and hydrogen is therefore obtained. This mixture is liable to contain traces of methane according to the greater or less accuracy with which the temperature has been controlled. It is particularly suitable and intended to be used for the production of chemical compounds, namely by synthesis in the presence of catalysts, in virtue of the fact that the said mixture is substantially free of hydrocarbons.

If in hydrogen producing apparatus the reductions are conducted so as to obtain maximum enrichment of the residual gas in methane and hydrocarbons, an insignificant consumption of coke in the cracking furnace results therefrom.

The speed of circulation in the furnace is function of the quantity of coke introduced.

In order to obtain the maximum efficiency, the particles of the coke used must be of sufficiently small size to offer to the gas the maximum contact surface. The smallness of the particles is solely limited by the necessity of avoiding an excessive loss of pressure in the apparatus.

On the other hand, the main phases of the manufacture of hydrogen by the processes based on the "iron-water vapor" reaction being usually completed by a blow-off operation having as resultant the production of a blow-off gas: hydrogen contaminated with reducing gas and loaded with water vapor, it is possible to treat this blow-off gas by the process described.

The accompanying drawing shows diagrammatically, and by way of example only, a plant for carrying out the present process.

A and A' denote ovens or furnaces externally heated from the burners B and used for treating according to the 'iron-water steam" process, the coke oven gas which is supplied through a pipe 1 and which is alternatively distributed to the said ovens by means of a valve C. In the drawing, the said gas arrives to the oven A containing iron oxides maintained at 350° C.

In the said oven or furnace, the oxides are more or less reduced by the gas and the latter is impoverished in carbon monoxide and hydrogen but enriched in carbon dioxide and steam; the exhaust gas is designated by the term residual gas; the same contains a somewhat great proportion of methane.

In the furnace A' are iron oxides which have been more or less reduced to the state of iron in a previous operation, and a stream of water steam, arriving through a duct 2 and a valve C', passes into the said furnace, so that the ferrous substances are oxidized again to the maximum while the exhaust gas consists in a mixture of hydrogen and steam.

The operation of the valves C and C' allows to revert periodically the play of the ovens or furnaces A and A', so that the residual gas, on the one hand, and hydrogen, on the other hand, are produced in a practically continuous manner.

Other valves D and D', disposed on the outlet pipes 3 and 4 of the furnaces, allow to supply in a continuous manner the residual gas to a cracking furnace E containing coke maintained at 1200° C. by external heating by means of burners F. In the said furnace, the carbon dioxide is reduced by the coke into carbon monoxide, methane and water steam are converted into carbon monoxide and hydrogen, so that a mixture of carbon monoxide of hydrogen and nitrogen containing but traces of methane is leaving through the pipe 5.

The hydrogen on leaving the furnace A' (or A) is conveyed through the valve D' (or D) to a pipe 6; the same can be added partly or wholly to the cracking gas in order to form a mixture of a composition which is suitable for the manufacture of some chemical compounds.

I claim:

A complete cyclic process for obtaining a mixture of hydrogen and carbon monoxide with a small proportion of nitrogen and only traces of hydrocarbons involving the change of Fe to FeO and back again by alternate treatment with steam and coke oven gas, consisting in first causing coke oven gases to pass over iron oxides at about 750° in hydrogen producing apparatus of the "iron-water steam" type, then causing the gases resulting from the said operation and coming directly from the said apparatus to pass continuously through a mass of coke, heated from the exterior at about 1,200° C., and in collecting the gaseous mixture leaving the said mass of coke, the coke being of sufficiently small sized particles to offer to the gas the maximum contact surface without causing excessive loss of pressure in the apparatus.

RAYMOND BLONDELLE.